United States Patent
Lovitt (10) Patent No.: US 9,338,553 B2
(45) Date of Patent: May 10, 2016

(54) SPECTRAL SHAPING FOR AUDIO MIXING

(71) Applicant: Microsoft Technology Licensing, LLC, Redmond, WA (US)

(72) Inventor: Andrew W. Lovitt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 14/450,257

(22) Filed: Aug. 3, 2014

(65) Prior Publication Data

US 2014/0334641 A1     Nov. 13, 2014

Related U.S. Application Data

(62) Division of application No. 13/088,760, filed on Apr. 18, 2011, now Pat. No. 8,804,984.

(51) Int. Cl.
| | |
|---|---|
| H03G 5/00 | (2006.01) |
| H04R 3/04 | (2006.01) |
| G11B 27/038 | (2006.01) |
| G10L 21/02 | (2013.01) |
| G10L 21/0208 | (2013.01) |
| G10L 19/008 | (2013.01) |
| H04M 3/56 | (2006.01) |
| G10L 21/0232 | (2013.01) |

(52) U.S. Cl.
CPC ...... *H04R 3/04* (2013.01); *G10L 21/02* (2013.01); *G11B 27/038* (2013.01); *G10L 19/008* (2013.01); *G10L 21/0232* (2013.01); *G10L 2021/02087* (2013.01); *H04M 3/568* (2013.01); *H04M 2203/5072* (2013.01); *H04R 2430/00* (2013.01)

(58) Field of Classification Search
CPC ........... H04H 60/04; H04R 3/04; H03G 5/165
USPC ..................................................... 381/98, 119
See application file for complete search history.

(56) References Cited

U.S. PATENT DOCUMENTS

| | | |
|---|---|---|
| 4,887,299 A | 12/1989 | Cummins et al. |
| 4,914,706 A | 4/1990 | Krause |
| 6,757,300 B1 | 6/2004 | Pages et al. |
| 7,856,240 B2 | 12/2010 | Gunn et al. |
| 8,498,667 B2 | 7/2013 | Chang et al. |
| 2006/0029239 A1 | 2/2006 | Smithers |
| 2008/0080720 A1 | 4/2008 | Jacob et al. |

(Continued)

OTHER PUBLICATIONS

"SonicOne1.1", Retrieved on: Feb. 3, 2011, 2 pages, Available at: http://http://free.zagruzit.com/en/mp3_audio/audio_tools/sonicone-58301.html.
"Loudness", Retrieved on: Mar. 14, 2014, 4 pages, Available at: http://en.wikipedia.org/wiki/Loudness.
"Non-Final Office Action Issued in U.S. Appl. No. 13/088,760", Mailed Date: Aug. 19, 2013, Filed Date: Apr. 18, 2011, 6 Pages.

(Continued)

*Primary Examiner* — Simon King
(74) *Attorney, Agent, or Firm* — John Jardine; Kate Drakos; Micky Minhas (57) ABSTRACT

Techniques are described herein that are capable of spectrally shaping audio signal(s) for audio mixing. Spectrally shaping an audio signal means modifying a frequency spectrum of the audio signal. A frequency spectrum of an audio signal is a representation of the audio signal in the frequency domain. For instance, a frequency spectrum may be represented using multiple frequency bands. The frequency spectrum may be modified by modifying characteristic(s) (e.g., magnitude, phase, etc.) one or more of the frequency bands.

20 Claims, 7 Drawing Sheets

(56) References Cited

U.S. PATENT DOCUMENTS

| | | |
|---|---|---|
| 2008/0199027 A1 | 8/2008 | Kleczkowski |
| 2009/0225980 A1 | 9/2009 | Schmidt et al. |
| 2009/0315688 A1 | 12/2009 | Kong et al. |
| 2010/0174389 A1 | 7/2010 | Blouet et al. |
| 2011/0125489 A1* | 5/2011 | Shin .................. H03G 3/32 704/205 |

OTHER PUBLICATIONS

"Non-Final Office Action Issued in U.S. Appl. No. 13/088,760", Mailed Date: Oct. 8, 2013, Filed Date: Apr. 18, 2011, 11 Pages.

"Notice of Allowance Issued in U.S. Appl. No. 13/088,760", Mailed Date: Apr. 7, 2014, Filed Date: Apr. 18, 2011, 17 Pages.

* cited by examiner

SPECTRAL SHAPING FOR AUDIO MIXING

CROSS-REFERENCE TO RELATED APPLICATION(S)

This application is a division of U.S. patent application Ser. No. 13/088,760, filed Apr. 18, 2011, the entirety of which is incorporated by reference herein.

BACKGROUND

Audio mixing is a technique in which multiple audio signals are mixed (e.g., combined) for delivery to a listener. For instance, if the listener is listening to a first audio signal and a second audio signal is detected, the second audio signal may be mixed with the first audio signal to provide what is referred to as a mixed signal. Audio systems typically process one or more of the audio signals before performing an audio mixing operation to enhance perception of the audio signals by the listener. For example, conventional audio systems often reduce the magnitude (i.e., acoustic level and/or psychoacoustic level) of one or more of the signals with respect to other audio signals before mixing them to provide the mixed signal. However, merely reducing the magnitude of certain audio signals may result in those signal(s) not being heard or not being entirely comprehended by the listener.

SUMMARY

Various approaches are described herein for, among other things, spectrally shaping audio signal(s) for audio mixing. Spectrally shaping an audio signal means modifying a frequency spectrum of the audio signal. A frequency spectrum of an audio signal is a representation of the audio signal in the frequency domain. For instance, a frequency spectrum may be represented using multiple frequency bands. The frequency spectrum may be modified by modifying characteristic(s) (e.g., magnitude, phase, etc.) of one or more of the frequency bands.

An example method is described in which a first audio signal is received that includes portions that correspond to respective frequency bands. A second audio signal is received. A determination is made that the second audio signal corresponds to a subset of the frequency bands. The subset includes fewer than all of the frequency bands. A subset of the portions of the first audio signal that corresponds to the subset of the frequency bands is identified. A magnitude of the subset of the portions is reduced with respect to portions of the first audio signal that are not included in the subset of the portions based on the second audio signal corresponding to the subset of the frequency bands. The first audio signal and the second audio signal are mixed to provide a mixed audio signal.

Another example method is described. In accordance with this example method, a first frequency spectrum of a first audio signal is analyzed to determine a first portion of the first frequency spectrum that has a magnitude that is lower than magnitudes of other portions of the first frequency spectrum. The first frequency spectrum is modified to decrease the magnitude of the first portion of the first frequency spectrum with respect to the other portions of the first frequency spectrum. A second frequency spectrum of a second audio signal is modified to increase a magnitude of a first portion of the second frequency spectrum with respect to other portions of the second frequency spectrum. The first portion of the first frequency spectrum and the first portion of the second frequency spectrum correspond to a common set of frequencies. The first audio signal and the second audio signal are mixed to provide a mixed audio signal.

Yet another example method is described. In accordance with this example method, a frequency spectrum of a first audio signal is analyzed to determine frequency spectrum criteria for selection of a second audio signal to be mixed with the first audio signal. The frequency spectrum criteria are compared to frequency spectrums of respective designated audio signals to determine a first frequency spectrum that satisfies the frequency spectrum criteria to a greater extent than others of the frequency spectrums. A second audio signal is selected from the designated audio signals to be mixed with the first audio signal based on the first frequency spectrum corresponding to the second audio signal.

An example system is described that includes a determination module, an identification module, a reduction module, and a mixer. The determination module is configured to receive a first audio signal that includes portions that correspond to respective frequency bands. The determination module is further configured to receive a second audio signal. The determination module is further configured to determine whether the second audio signal corresponds to a subset of the frequency bands that includes fewer than all of the frequency bands. The identification module is configured to identify a subset of the portions of the first audio signal that corresponds to the subset of the frequency bands. The reduction module is configured to reduce a magnitude of the subset of the portions with respect to portions of the first audio signal that are not included in the subset of the portions based on the second audio signal corresponding to the subset of the frequency bands. The mixer is configured to mix the first audio signal and the second audio signal to provide a mixed audio signal.

Another example system is described that includes an analyzer, a modification module, and a mixer. The analyzer is configured to analyze a first frequency spectrum of a first audio signal to determine a first portion of the first frequency spectrum that has a magnitude that is lower than magnitudes of other portions of the first frequency spectrum. The modification module is configured to modify the first frequency spectrum to decrease the magnitude of the first portion of the first frequency spectrum with respect to the other portions of the first frequency spectrum in response to the magnitude of the first portion of the first frequency spectrum being lower than the magnitudes of the other portions of the first frequency spectrum. The modification module is further configured to modify a second frequency spectrum of a second audio signal to increase a magnitude of a first portion of the second frequency spectrum with respect to other portions of the second frequency spectrum in response to the magnitude of the first portion of the first frequency spectrum being lower than the magnitudes of the other portions of the first frequency spectrum. The first portion of the first frequency spectrum and the first portion of the second frequency spectrum correspond to a common set of frequencies. The mixer is configured to mix the first audio signal and the second audio signal to provide a mixed audio signal.

Yet another example system is described that includes an analyzer, a comparison module, and a selection module. The analyzer is configured to analyze a frequency spectrum of a first audio signal to determine frequency spectrum criteria for selection of a second audio signal to be mixed with the first audio signal. The comparison module is configured to compare the frequency spectrum criteria to frequency spectrums of respective designated audio signals to determine a first frequency spectrum that satisfies the frequency spectrum criteria to a greater extent than others of the frequency spectrums. The selection module is configured to select a second audio signal from the designated audio signals to be mixed with the first audio signal based on the first frequency spectrum corresponding to the second audio signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of spectrally shaping audio signal(s) for audio mixing. Spectrally shaping an audio signal means modifying a frequency spectrum of the audio signal. A frequency spectrum of an audio signal is a representation of the audio signal in the frequency domain. For instance, a frequency spectrum may be represented using multiple frequency bands (e.g., cochlear bands, Fourier Transform Coefficients, arbitrary filter bank, etc.). The frequency spectrum may be modified by modifying characteristic(s) (e.g., magnitude, phase, etc.) of a first subset of the frequency bands with respect to a second subset of the frequency bands and/or with respect to frequency bands that correspond to a different audio signal. Alternatively, the frequency spectrum may be modified by modifying such characteristic(s) of frequency band(s) independently from other frequency bands. Audio mixing may involve any of a variety of operations, such as combining of audio signals, applying gains to the respective audio signals before they are combined, applying a common gain once the signals are combined, etc.

Example techniques described herein have a variety of benefits as compared to conventional techniques for processing audio signals for mixing. For instance, some example techniques may improve a likelihood that each of various audio signals can be heard by a listener once the audio signals are mixed. When supplemental audio signal(s) are mixed with an original audio signal, some example techniques may be capable of setting a magnitude (i.e., an acoustic level and/or a psychoacoustic level) of the resulting mixed audio signal to be the same as a magnitude of the original audio signal before the original audio signal and the supplemental audio signal(s) were mixed. If a listener is familiar with the original audio signal, a modification of the frequency spectrum of the original audio signal and/or of the frequency spectrum of the supplemental audio signal(s) may not be detected by the listener. Some example techniques are capable of spectrally and/or temporally shaping original audio signal(s) to accommodate supplemental audio signal(s). Some example techniques are capable of spectrally and/or temporally shaping supplemental audio signal(s) to accommodate original audio signal(s). Some example techniques are capable of choosing spectral content of supplemental signal(s) based on a frequency spectrum of original audio signal(s). The frequency spectrum of supplemental audio signal(s) may be modified statically (i.e., without regard to changes in the frequency spectrum of original audio signal(s)) or dynamically (e.g., on the fly) as the frequency spectrum of the original audio signal(s) changes with respect to time.

Figure 1:
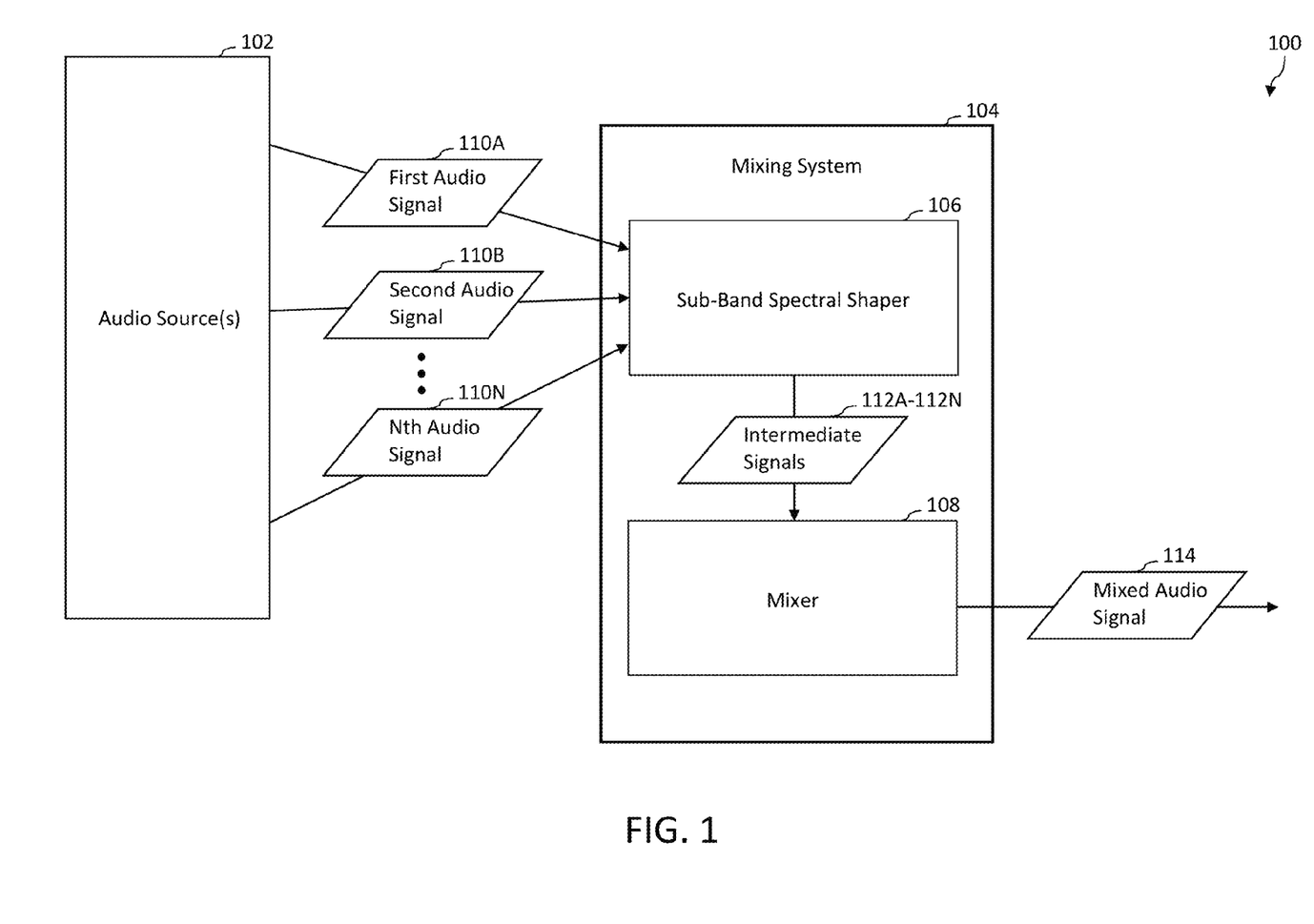
FIG. 1 is a block diagram of an example audio system in accordance with an embodiment.

FIG. 1 is a block diagram of an example audio system 100 in accordance with an embodiment. Generally speaking, audio system 100 operates to mix audio signals from any one or more audio sources to provide a mixed audio signal. As shown in FIG. 1, audio system 100 includes audio source(s) 102 and mixing system 104.

Audio source(s) 102 provide a plurality of audio signals 110A-110N for further processing by mixing system 104. Each of the audio source(s) 102 may be a satellite, a base station, a cable headend, a computer-readable storage medium (e.g., device-side storage or cloud storage), a radio, or other suitable type of audio source. Each of the audio signals 110A-110N may be an audio content signal, an audio notification signal, an earcon, a non-earcon, other suitable type of audio signal, or any combination thereof. An audio content signal is an audio signal that represents music and/or speech (e.g., driving directions). An audio notification signal is an audio signal that represents one or more tones that are configured to notify a listener of an event or a circumstance. For instance, an audio notification signal may be a warning signal that indicates potential danger, a ring tone that indicates receipt of an incoming telephone call, etc. "Earcon" is a term that is well-known in the relevant art(s). A non-earcon is an audio signal that is not an earcon.

An audio notification signal or an earcon may have a narrower frequency spectrum than an audio content signal or a non-earcon, though the scope of the embodiments is not limited in this respect. For instance, an audio notification or an earcon may have a frequency spectrum that extends from 300 Hz to 2000 Hz, while an audio content signal or a non-earcon may have a frequency spectrum that extends from 20 Hz to 20,000 Hz. These example frequency ranges are provided for illustrative purposes and are not intended to be limiting. It will be recognized that audio notification signals, earcons, audio content signals, and non-earcons may have frequency spectrums that correspond to any suitable frequency ranges.

Mixing system 104 is a processing system that is capable of mixing audio signals (e.g., audio signals 110A-110N) to provide a mixed audio signal (e.g., mixed audio signal 114). An example of a processing system is a system that includes at least one processor that is capable of manipulating data in accordance with a set of instructions. For instance, a processing system may be a computer, a personal digital assistant, etc. Mixing system 104 includes a sub-band spectral shaper 106 and a mixer 108.

Sub-band spectral shaper 106 is configured to spectrally shape any one or more of the audio signals 110A-110N to provide intermediate signals 112A-112N, which correspond to the respective audio signals 110A-110N. For instance, sub-band spectral shaper 106 may be capable of reducing (e.g., minimizing) frequency overlap among the intermediate signals 112A-112N, as compared to the audio signals 110A-110N. Some example techniques for spectrally shaping audio signal(s) are described below with reference to FIGS. 2-7.

Mixer 108 is configured to mix the intermediate signals 112A-112N to provide mixed audio signal 114.

Figure 2:
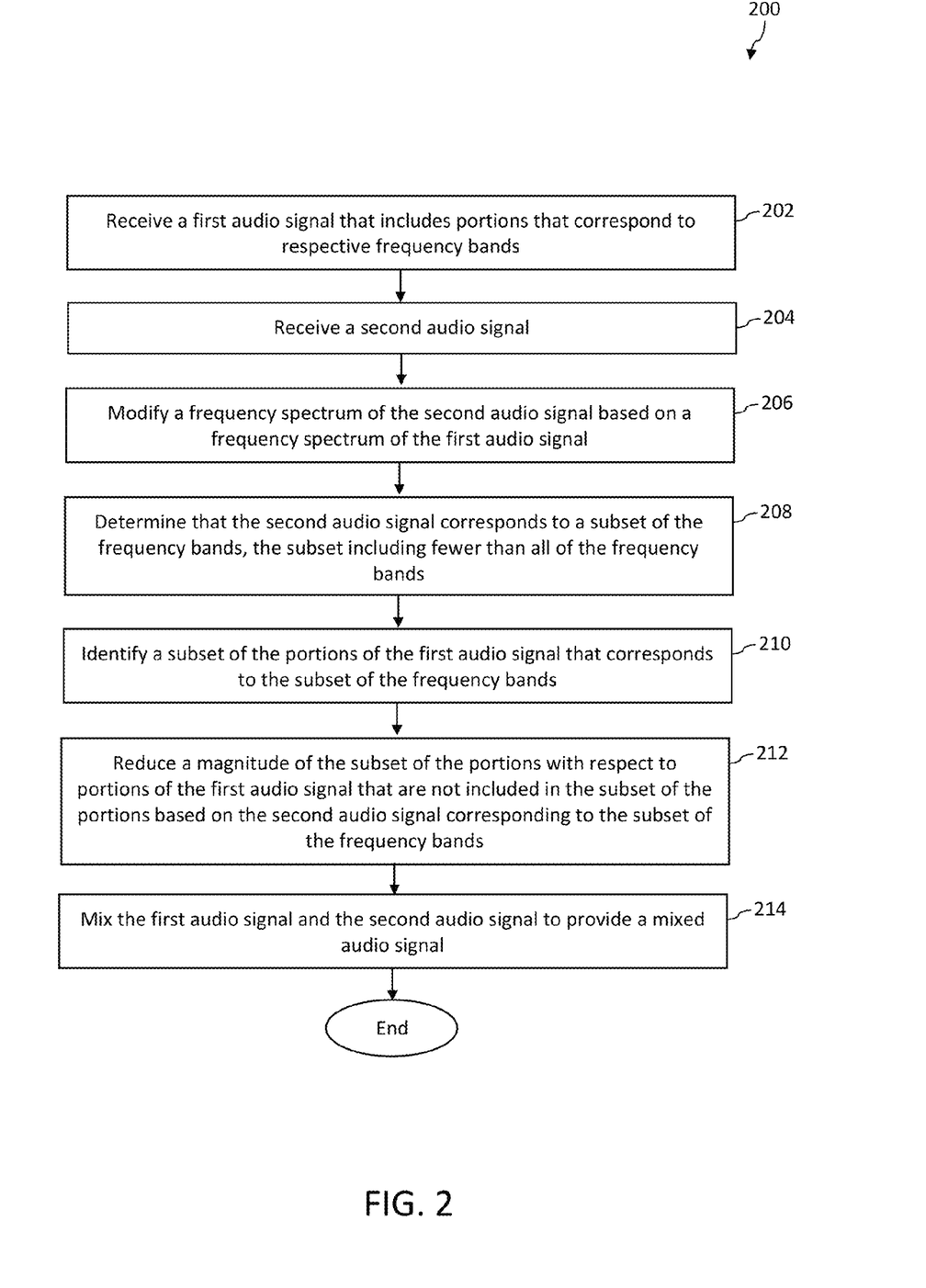
FIGS. 2 and 6 depict flowcharts of example methods for spectrally shaping audio signal(s) in accordance with embodiments.
Figure 3:
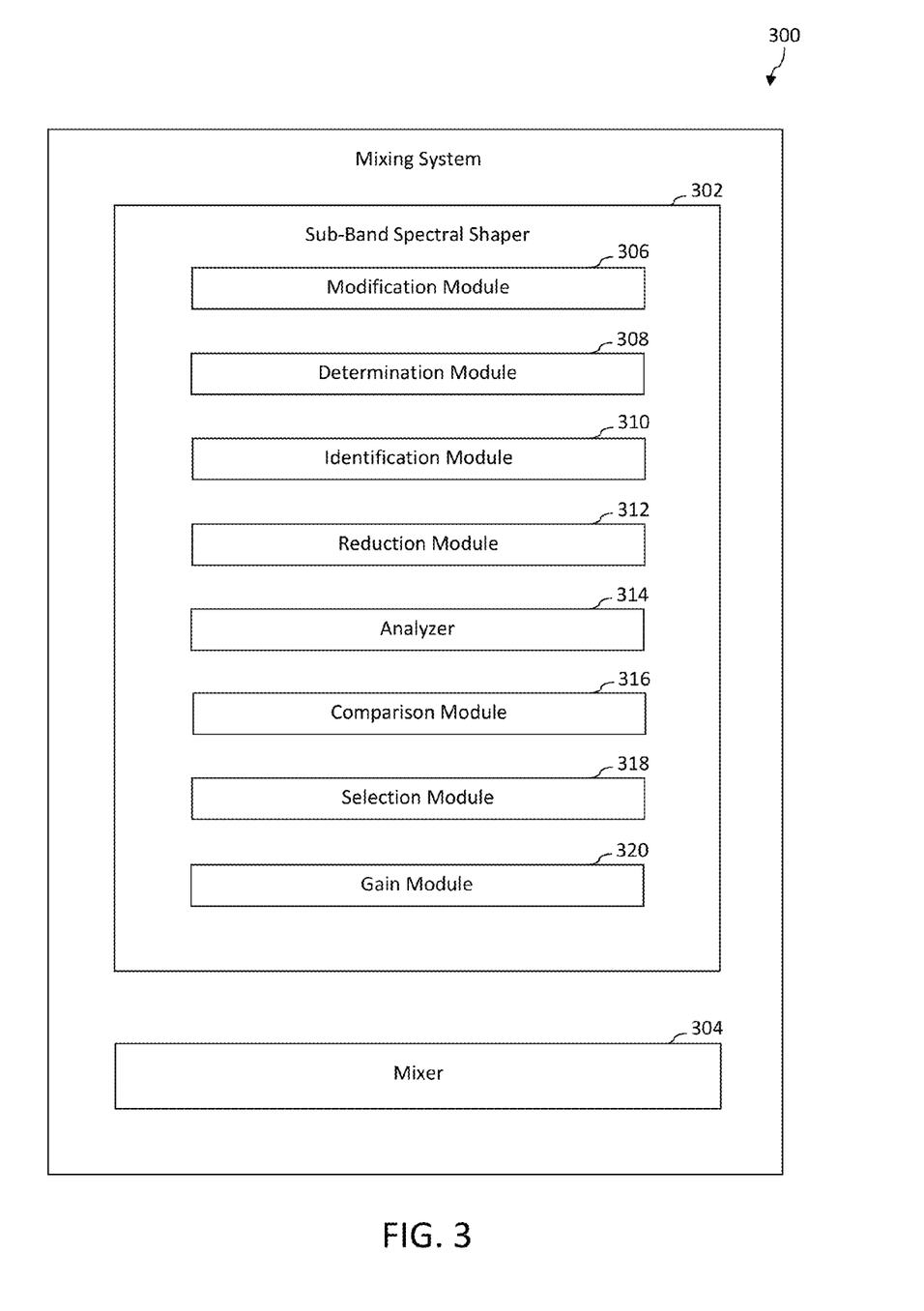
FIG. 3 is a block diagram of an example implementation of a mixing system shown in FIG. 1 in accordance with an embodiment.

FIG. 2 depicts a flowchart 200 of an example method for spectrally shaping audio signal(s) in accordance with an embodiment. Flowchart 200 may be performed by mixing system 104 of audio system 100 shown in FIG. 1, for example. For illustrative purposes, flowchart 200 is described with respect to a mixing system 300 shown in FIG. 3, which is an example of a mixing system 104, according to an embodiment. As shown in FIG. 3, mixing system 300 includes a sub-band spectral shaper 302 and a mixer 304. Sub-band spectral shaper 302 includes a modification module 306, a determination module 308, an identification module 310, a reduction module 312, an analyzer 314, a comparison module 316, a selection module 318, and a gain module 320. Further structural and operational embodiments will be apparent to persons skilled in the relevant art(s) based on the discussion regarding flowchart 200.

As shown in FIG. 2, the method of flowchart 200 begins at step 202. In step 202, a first audio signal is received that includes portions that correspond to respective frequency bands. In an example implementation, modification module 306 receives the first audio signal.

At step 204, a second audio signal is received. For example, the second audio signal may be selected from a group of audio signals based on a relationship between a frequency spectrum of the first audio signal and a frequency spectrum of the second audio signal. In accordance with this example, the frequency spectrum of the first audio signal includes the frequency bands with which the portions of the first audio signal correspond. In an example implementation, modification module 306 receives the second audio signal.

At step 206, a frequency spectrum of the second audio signal is modified based on a frequency spectrum of the first audio signal. It will be recognized that in addition to or in lieu of modifying the frequency spectrum of the second audio signal, the frequency spectrum of the first audio signal may be modified based on the frequency spectrum of the second audio signal. In an example implementation, modification module 306 modifies the frequency spectrum of the second audio signal based on the frequency spectrum of the first audio signal.

At step 208, a determination is made that the second audio signal corresponds to a subset of the frequency bands. The subset includes fewer than all of the frequency bands. As an example, the subset may represent any one or more frequency ranges, such as consecutive frequency ranges or disjoint frequency ranges. In an example implementation, determination module 308 determines that the second audio signal corresponds to the subset of the frequency bands.

At step 210, a subset of the portions of the first audio signal is identified that corresponds to the subset of the frequency bands. In an example implementation, identification module 310 identifies the subset of the portions of the first audio signal that corresponds to the subset of the frequency bands.

At step 212, a magnitude of the subset of the portions is reduced with respect to portions of the first audio signal that are not included in the subset of the portions based on the second audio signal corresponding to the subset of the frequency bands. A magnitude may represent an amount of energy, power, acoustic pressure, etc. Accordingly, the magnitude of the subset of the portions may represent an amount of energy, power, acoustic pressure, etc. that is associated with the subset of the portions. In an example, the subset of the portions may be removed from the first audio signal. In another example, the magnitude of the subset of the portions may be reduced using one or more filters, such as a band-pass filter, a notch filter, a low-pass filter, a high-pass filter, etc. It will be recognized that, in addition to reducing the magnitude of the subset of the portions, other characteristic(s) (e.g., phase) of the subset of the portions may be modified. For instance, reducing the magnitude of the subset of the portions may cause such other characteristic(s) to be modified. In an example implementation, reduction module 312 reduces the magnitude of the subset of the portions with respect to portions of the first audio signal that are not included in the subset of the portions.

At step 214, the first audio signal and the second audio signal are mixed to provide a mixed audio signal. In an example implementation, mixer 304 mixes the first and second audio signals to provide the mixed signal.

Flowchart 200 is described with respect to a single second audio signal for illustrative purposes and is not intended to be limiting. It will be recognized that the steps depicted in flowchart 200 may be performed with respect to any suitable number of second audio signals. For example, any one or more of steps 204, 206, 208, 210, 212, and 214 may be performed iteratively with respect to multiple second audio signals.

In some example embodiments, one or more steps 202, 204, 206, 208, 210, 212, and/or 214 of flowchart 200 may not be performed. Moreover, steps in addition to or in lieu of steps 202, 204, 206, 208, 210, 212, and/or 214 may be performed. For instance, in an example embodiment, the first audio signal may have a specified (e.g., computed) perceptual characteristic. Examples of a perceptual characteristic of an audio signal include but are not limited to acoustic intensity, loudness, pitch, and timbre. Acoustic intensity represents an amount of energy that is contained in an audio signal. Loudness is a psychoacoustic representation of an acoustic intensity to a listener. Timbre is a quality of an audio signal, independent of pitch and loudness, from which a source of the audio signal and/or a manner in which the audio signal was produced can be inferred. In accordance with this embodiment a first gain is applied to the first audio signal and a second gain is applied to the second audio signal. In further accordance with this embodiment, the first audio signal and the second audio signal are mixed, as described with respect to step 214, to provide the mixed audio signal having the specified perceptual characteristic in response to applying the first gain to the first audio signal and the second gain to the second audio signal. In an example implementation, gain module 320 applies the first gain to the first audio signal and the second gain to the second audio signal.

It will be recognized that mixing system 300 may not include one or more of sub-band spectral shaper 302, mixer 304, modification module 306, determination module 308, identification module 310, reduction module 312, analyzer 314, comparison module 316, selection module 318, and/or gain module 320. Furthermore, mixing system 300 may include modules in addition to or in lieu of sub-band spectral shaper 302, mixer 304, modification module 306, determination module 308, identification module 310, reduction module 312, analyzer 314, comparison module 316, selection module 318, and/or gain module 320. Analyzer 314, comparison module 316, and selection module 318 are described below with reference to flowcharts 600 and 700 of respective FIGS. 6 and 7.

Figure 4:
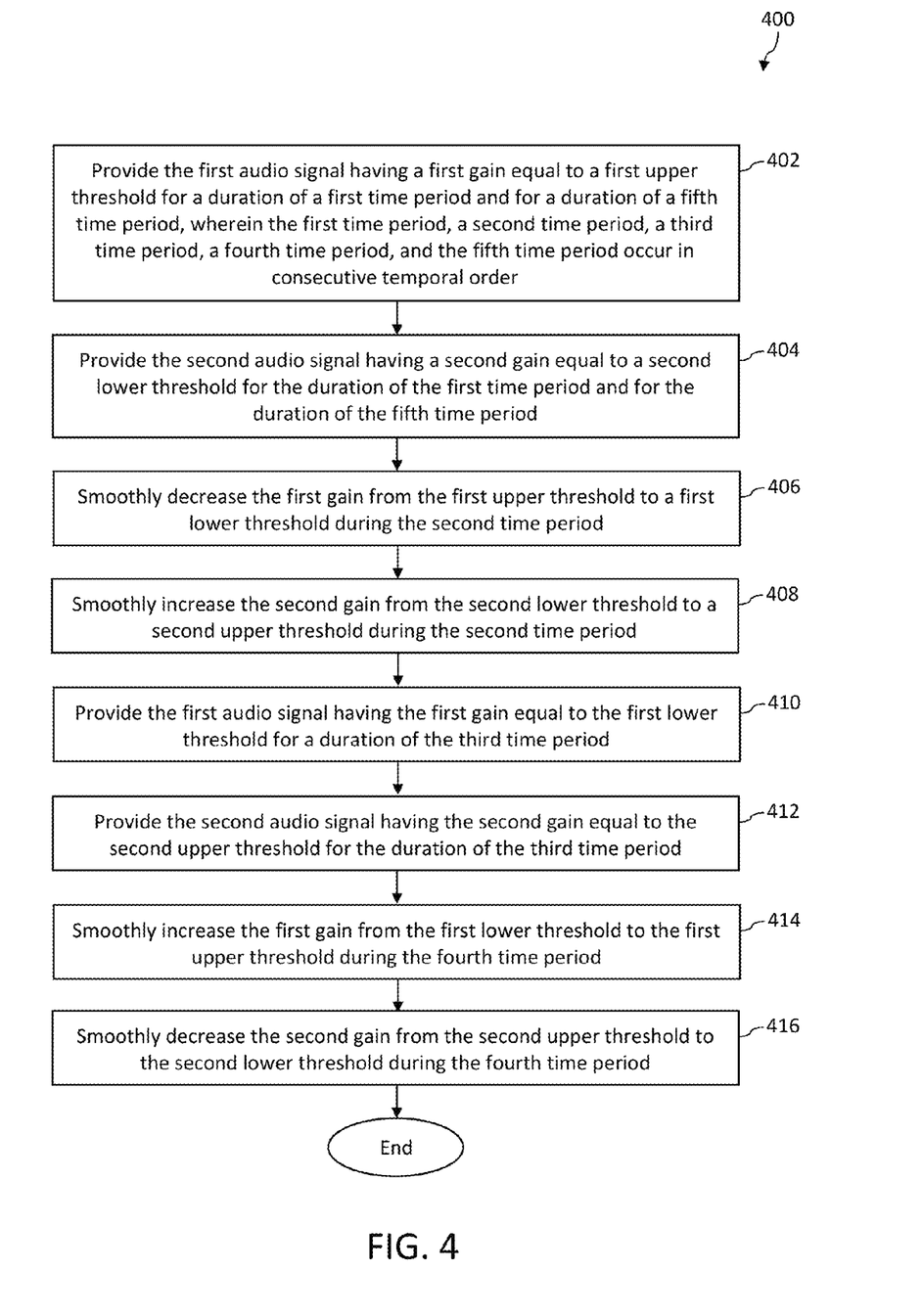
FIG. 4 depicts a flowchart of an example method for mixing audio signals in accordance with an embodiment.
Figure 5:
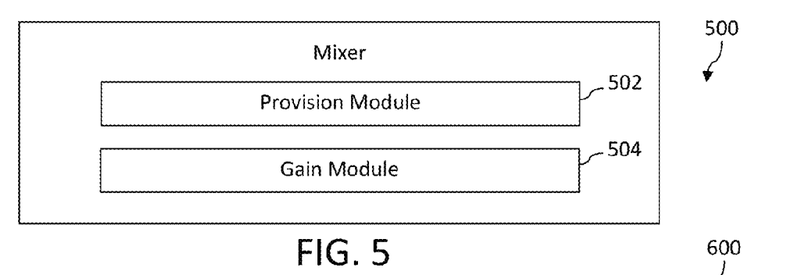
FIG. 5 is a block diagram of an example implementation of a mixer shown in FIG. 1 or 3 in accordance with an embodiment.

FIG. 4 depicts a flowchart 400 of an example implementation of step 214 of flowchart 200 shown in FIG. 2 in accordance with an embodiment. Flowchart 400 may be performed by mixer 304 of mixing system 300 shown in FIG. 3, for example. For illustrative purposes, flowchart 400 is described with respect to a mixer 500 shown in FIG. 5, which is an example of mixer 304, according to an embodiment. As shown in FIG. 5, mixer 500 includes a provision module 502 and a gain module 504. Further structural and operational embodiments will be apparent to persons skilled in the relevant art(s) based on the discussion regarding flowchart 400.

As shown in FIG. 4, the method of flowchart 400 begins at step 402. In step 402, the first audio signal having a first gain equal to a first upper threshold is provided for a duration of a first time period and for a duration of a fifth time period. The first time period, a second time period, a third time period, a fourth time period, and the fifth time period occur in consecutive temporal order. In an example implementation, provision module 502 provides the first audio signal having the first gain equal to the first upper threshold for the duration of the first time period and for the duration of the fifth time period.

At step 404, the second audio signal having a second gain equal to a second lower threshold is provided for the duration of the first time period and for the duration of the fifth time period. In an example implementation, provision module 502 provides the second audio signal having the second gain equal to the second lower threshold for the duration of the first time period and for the duration of the fifth time period.

At step 406, the first gain is smoothly decreased from the first upper threshold to a first lower threshold during the second time period. In an example implementation, gain module 504 smoothly decreases the first gain from the first upper threshold to the first lower threshold during the second time period.

At step 408, the second gain is smoothly decreased from the second lower threshold to a second upper threshold during the second time period. In an example implementation, gain module 504 smoothly decreases the second gain from the second lower threshold to the second upper threshold during the second time period.

At step 410, the first audio signal having the first gain equal to the first lower threshold is provided for a duration of the third time period. In an example implementation, provision module 502 provides the first audio signal having the first gain equal to the first lower threshold for the duration of the third time period.

At step 412, the second audio signal having the second gain equal to the second upper threshold is provided for the duration of the third time period. In an example implementation, provision module 502 provides the second audio signal having the second gain equal to the second upper threshold for the duration of the third time period.

At step 414, the first gain is smoothly increased from the first lower threshold to the first upper threshold during the fourth time period. In an example implementation, gain module 504 smoothly increases the first gain from the first lower threshold to the first upper threshold during the fourth time period.

At step 416, the second gain is smoothly decreased from the second upper threshold to the second lower threshold during the fourth time period. In an example implementation, gain module 504 smoothly decreases the second gain from the second upper threshold to the second lower threshold during the fourth time period.

Flowchart 400 is described with respect to a single second audio signal for illustrative purposes and is not intended to be limiting. It will be recognized that the steps depicted in flowchart 400 may be performed with respect to any suitable number of second audio signals. For example, any one or more of steps 402, 404, 406, 408, 410, 412, 414, and 416 may be performed iteratively with respect to multiple second audio signals.

In some example embodiments, one or more steps 402, 404, 406, 408, 410, 412, 414, and/or 416 of flowchart 400 may not be performed. Moreover, steps in addition to or in lieu of steps 402, 404, 406, 408, 410, 412, 414, and/or 416 may be performed.

It will be recognized that mixer 500 may not include one or more of provision module 502 and/or gain module 504. Furthermore, mixer 500 may include modules in addition to or in lieu of provision module 502 and/or gain module 504.

Figure 6:
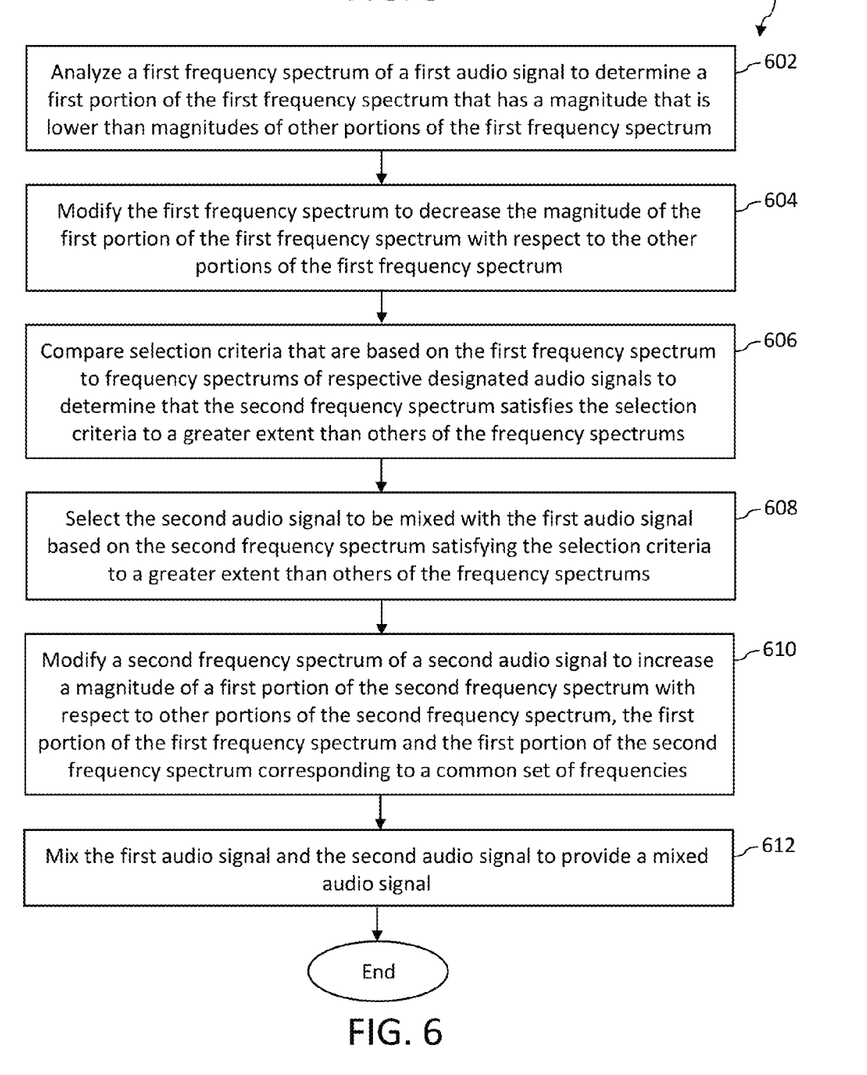
Figure 7:
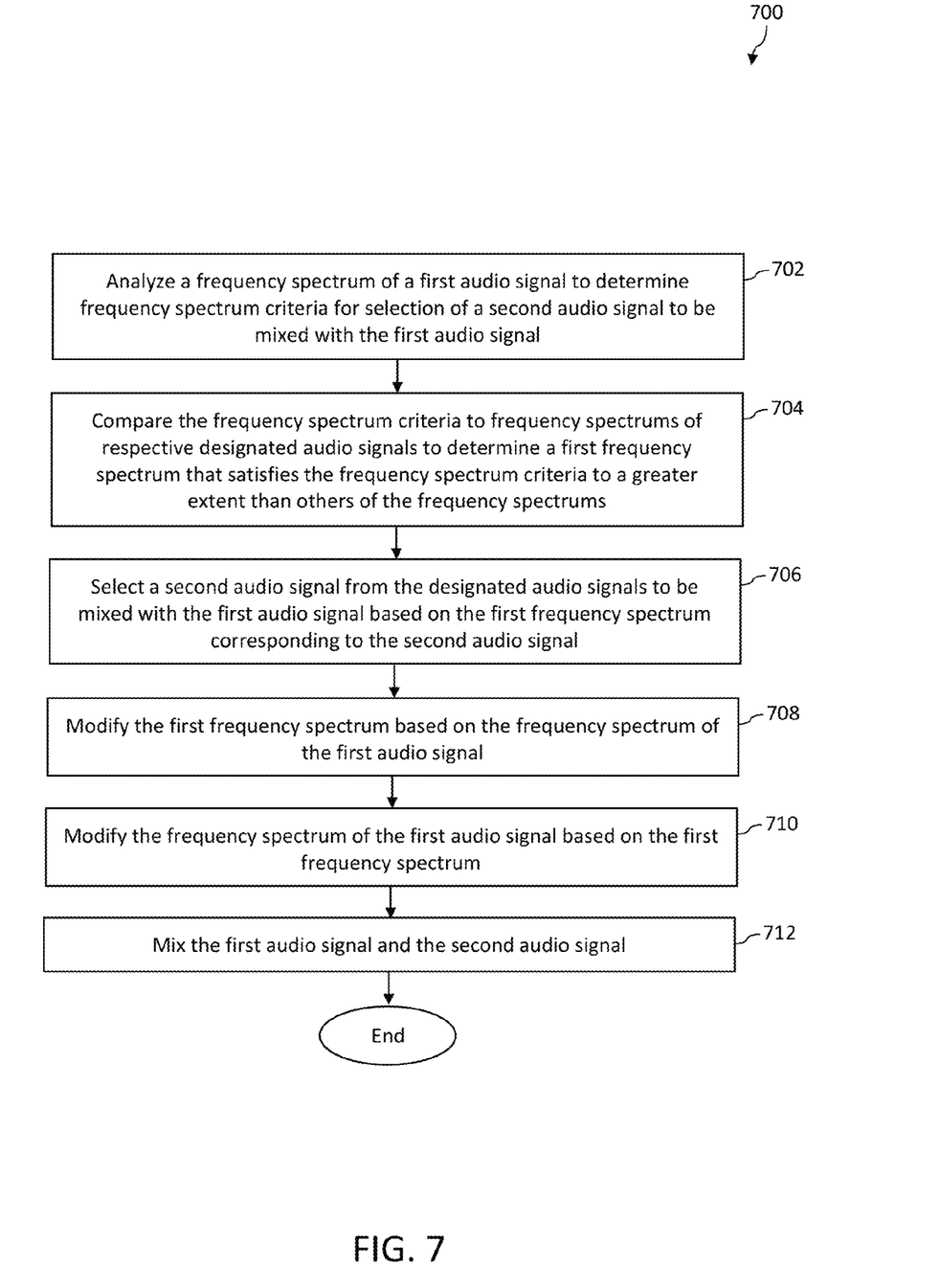
FIG. 7 depicts a flowchart of an example method for selecting an audio signal to be mixed with another audio signal in accordance with an embodiment.

FIG. 6 depicts a flowchart 600 of another example method for spectrally shaping audio signal(s) in accordance with an embodiment. FIG. 7 depicts a flowchart 700 of an example method for selecting an audio signal to be mixed with another audio signal in accordance with an embodiment. Flowcharts 600 and 700 may be performed by mixing system 104 of audio system 100 shown in FIG. 1, for example. For illustrative purposes, flowcharts 600 and 700 are described with respect to mixing system 300 shown in FIG. 3, which is an example of a mixing system 104, according to an embodiment.

As shown in FIG. 6, the method of flowchart 600 begins at step 602. In step 602, a first frequency spectrum of a first audio signal is analyzed to determine a first portion of the first frequency spectrum that has a magnitude that is lower than magnitudes of other portions of the first frequency spectrum. In an example implementation, analyzer 314 analyzes the first frequency spectrum of the first audio signal to determine the first portion of the first frequency spectrum that has a magnitude that is lower than magnitudes of other portions of the first frequency spectrum.

At step 604, the first frequency spectrum is modified to decrease the magnitude of the first portion of the first frequency spectrum with respect to the other portions of the first frequency spectrum. For instance, the first frequency spectrum may be modified in response to the magnitude of the first portion of the first frequency spectrum being lower than the magnitudes of the other portions of the first frequency spectrum. In an example implementation, modification module 306 modifies the first frequency spectrum to decrease the magnitude of the first portion of the first frequency spectrum with respect to the other portions of the first frequency spectrum.

In an example embodiment, the magnitude of the first portion of the first frequency spectrum is decreased to approximately zero. The magnitude of the first portion of the first frequency spectrum may be said to be approximately zero if the magnitude of the first portion of the first frequency spectrum is reduced by at least a designated amount (e.g., 90%, 95%, 98%, 99%, etc.), if the magnitude of the first portion of the first frequency spectrum is reduced to be less than a designated amount (e.g., 0.1%, 1%, 2%, 5%, 10%, etc.) of a mean, median, or peak magnitude of the first frequency spectrum or the first portion thereof, or if the first portion is removed from the first frequency spectrum.

At step 606, selection criteria that are based on the first frequency spectrum are compared to frequency spectrums of respective designated audio signals to determine that the second frequency spectrum satisfies the selection criteria to a greater extent than others of the frequency spectrums. It will be recognized that the second frequency spectrum need not necessarily satisfy the selection criteria the best of all the frequency spectrums. In an example implementation, comparison module 316 compares the selection criteria to frequency spectrums of respective designated audio signals to determine that the second frequency spectrum satisfies the selection criteria to a greater extent than others of the frequency spectrums.

At step 608, the second audio signal is selected to be mixed with the first audio signal based on the second frequency spectrum satisfying the selection criteria to a greater extent than others of the frequency spectrums. It will be recognized that the second audio signal may be selected to be mixed with the first audio signal based on factor(s) in addition to the second frequency spectrum satisfying the selection criteria to a greater extent than others of the frequency spectrums. In an example implementation, selection module 318 selects the second audio signal to be mixed with the first audio signal based on the second frequency spectrum satisfying the selection criteria to a greater extent than others of the frequency spectrums.

At step 610, a second frequency spectrum of a second audio signal is modified to increase a magnitude of a first portion of the second frequency spectrum with respect to other portions of the second frequency spectrum. For instance, the second frequency spectrum may be modified in response to the magnitude of the first portion of the first frequency spectrum being lower than the magnitudes of the other portions of the first frequency spectrum. The first portion of the first frequency spectrum and the first portion of the second frequency spectrum correspond to a common set of frequencies. For instance, the common set of frequencies may represent any one or more frequency ranges, such as consecutive frequency ranges or disjoint frequency ranges. In an example implementation, modification module 306 modifies the second frequency spectrum of the second audio signal to increase the magnitude of the first portion of the second frequency spectrum with respect to other portions of the second frequency spectrum.

At step 612, the first audio signal and the second audio signal are mixed to provide a mixed audio signal. For instance, the first and second audio signals may be mixed as described above with reference to flowchart 400 of FIG. 4, though the scope of the example embodiments is not limited in this respect. In an example implementation, mixer 304 mixes the first audio signal and the second audio signal to provide the mixed audio signal.

The magnitudes described herein may be "actual magnitudes" or "apparent magnitudes". An apparent magnitude is a magnitude as perceived by a listener, which may or may not be the same as a corresponding actual magnitude. For instance, audio signals (or portions thereof) having a common actual magnitude may be perceived by a listener as having different magnitudes. As an example, a first signal having a relatively low frequency may have a lower apparent magnitude than a second signal having a relatively high frequency, even if the first and second signals have the same actual magnitude.

The steps of flowchart 602 refer to magnitudes of the first portions of the first and second frequency spectrums for illustrative purposes. It will be recognized that the embodiments are not limited in this respect. For instance, the term "magnitude" may be replaced with any suitable characteristic(s) of the first portions of the first and second frequency spectrums. Moreover, any suitable modification(s) (e.g., increase, decrease, etc.) may be made to such characteristic(s) of the first portions of the first and second frequency spectrums.

In some example embodiments, one or more steps 602, 604, 606, 608, 610, and/or 612 of flowchart 600 may not be performed. Moreover, steps in addition to or in lieu of steps 602, 604, 606, 608, 610, and/or 612 may be performed. For instance, in an example embodiment, the first audio signal may have a specified perceptual characteristic. In accordance with this embodiment a first gain is applied to the first audio signal and a second gain is applied to the second audio signal. In further accordance with this embodiment, the first audio signal and the second audio signal are mixed, as described with respect to step 612, to provide the mixed audio signal having the specified perceptual characteristic in response to applying the first gain to the first audio signal and the second gain to the second audio signal. In an example implementation, gain module 320 applies the first gain to the first audio signal and the second gain to the second audio signal.

As shown in FIG. 7, the method of flowchart 700 begins at step 702. In step 702, a frequency spectrum of a first audio signal is analyzed to determine frequency spectrum criteria for selection of a second audio signal to be mixed with the first audio signal. For instance, the frequency spectrum criteria may be determined to provide less (e.g., the least) degradation of the first audio signal than other selection criteria. In an example implementation, analyzer 314 analyzes the frequency spectrum of the first audio signal to determine the frequency spectrum criteria.

In an example embodiment, the frequency spectrum of the first audio signal is analyzed to determine specified frequency band(s) in the frequency spectrum of the first audio signal that have a lesser magnitude than other frequency bands in the frequency spectrum of the first audio signal. In accordance with this embodiment, the frequency spectrum criteria are determined to indicate a greater magnitude in the specified frequency band(s) than in the other frequency bands. The specified frequency band(s) may represent any one or more frequency ranges, such as consecutive frequency ranges or disjoint frequency ranges.

At step 704, the frequency spectrum criteria is compared to frequency spectrums of respective designated audio signals to determine a first frequency spectrum that satisfies the frequency spectrum criteria to a greater extent than others of the frequency spectrums. In an example implementation, comparison module 316 compares the frequency spectrum criteria to frequency spectrums of the respective designated audio signals to determine the first frequency spectrum that satisfies the frequency spectrum criteria to a greater extent than others of the frequency spectrums.

At step 706, a second audio signal is selected from the designated audio signals to be mixed with the first audio signal based on the first frequency spectrum corresponding to the second audio signal. In an example implementation, selection module 318 selects the second audio signal from the designated audio signals to be mixed with the first audio signal based on the first frequency spectrum corresponding to the second audio signal.

At step 708, the first frequency spectrum is modified based on the frequency spectrum of the first audio signal. In an example implementation, modification module 306 modifies the first frequency spectrum based on the frequency spectrum of the first audio signal.

At step 710, the frequency spectrum of the first audio signal is modified based on the first frequency spectrum. In an example implementation, modification module 306 modifies the frequency spectrum of the first audio signal based on the first frequency spectrum.

At step 712, the first audio signal and the second audio signal are mixed. For instance, the first and second audio signals may be mixed as described above with reference to flowchart 400 of FIG. 4, though the scope of the example embodiments is not limited in this respect. In an example implementation, mixer 304 mixes the first audio signal and the second audio signal.

In some example embodiments, one or more steps 702, 704, 706, 708, 710, and/or 712 of flowchart 700 may not be performed. Moreover, steps in addition to or in lieu of steps 702, 704, 706, 708, 710, and/or 712 may be performed. For instance, in an example embodiment, the first audio signal may have a specified perceptual characteristic. In accordance with this embodiment a first gain is applied to the first audio signal and a second gain is applied to the second audio signal. In further accordance with this embodiment, the first audio signal and the second audio signal are mixed, as described with respect to step 712, to provide the mixed audio signal having the specified perceptual characteristic in response to applying the first gain to the first audio signal and the second gain to the second audio signal. In an example implementation, gain module 320 applies the first gain to the first audio signal and the second gain to the second audio signal.

Sub-band spectral shaper 106, mixer 108, sub-band spectral shaper 302, mixer 304, modification module 306, determination module 308, identification module 310, reduction module 312, analyzer 314, comparison module 316, selection module 318, gain module 320, provision module 502, and gain module 504 may be implemented in hardware, software, firmware, or any combination thereof. For example, sub-band spectral shaper 106, mixer 108, sub-band spectral shaper 302, mixer 304, modification module 306, determination module 308, identification module 310, reduction module 312, analyzer 314, comparison module 316, selection module 318, gain module 320, provision module 502, and/or gain module 504 may be implemented as computer program code configured to be executed in one or more processors. In another example, sub-band spectral shaper 106, mixer 108, sub-band spectral shaper 302, mixer 304, modification module 306, determination module 308, identification module 310, reduction module 312, analyzer 314, comparison module 316, selection module 318, gain module 320, provision module 502, and/or gain module 504 may be implemented as hardware logic/electrical circuitry.

Figure 8:
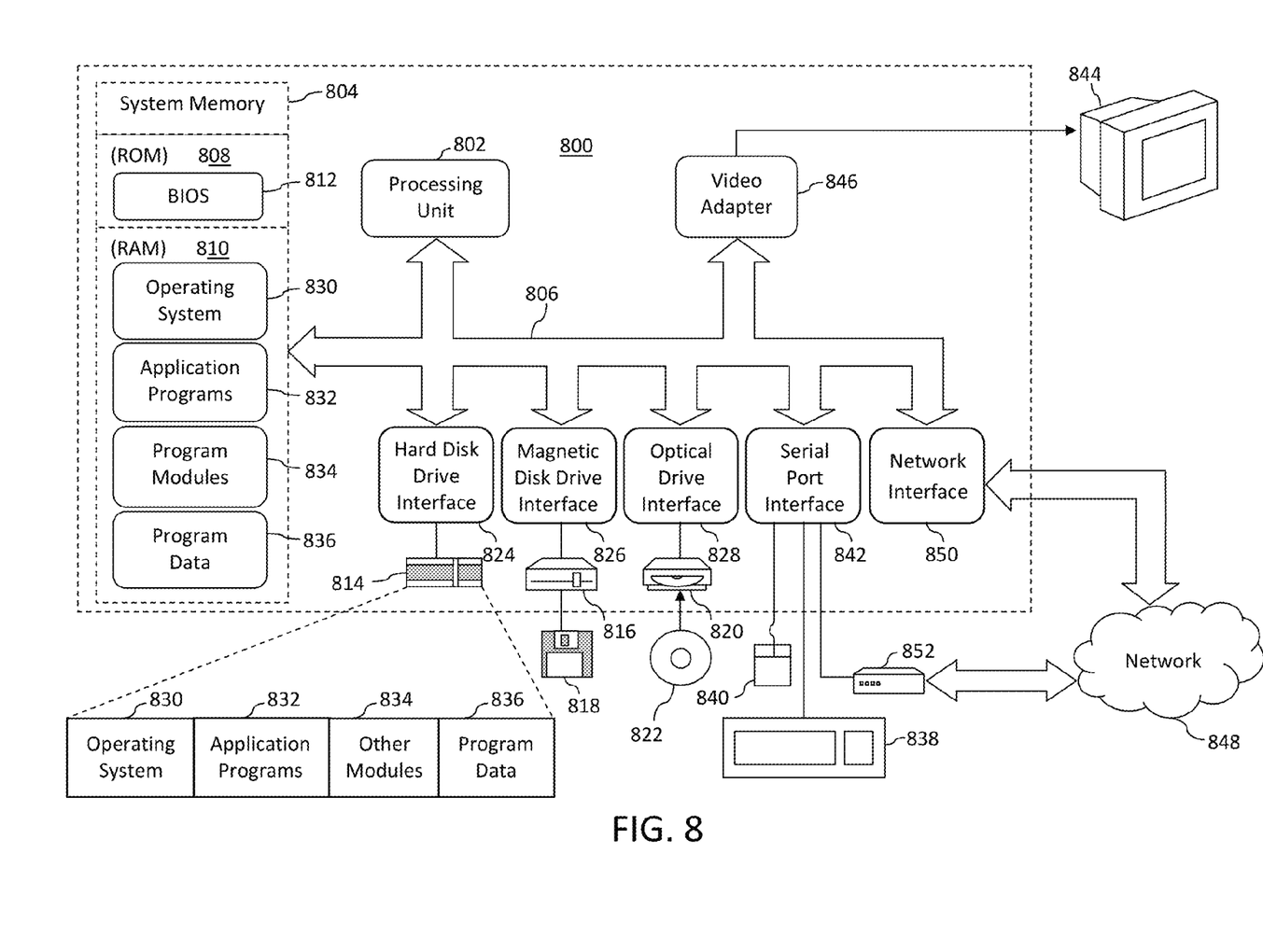
FIG. 8 depicts an example computer in which embodiments may be implemented.

FIG. 8 depicts an example computer 800 in which embodiments may be implemented. Mixing system 104 shown in FIG. 1 (or any one or more subcomponents thereof shown in FIGS. 3 and 5) may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing sub-band spectral shaper 106, mixer 108, sub-band spectral shaper 302, mixer 304, modification module 306, determination module 308, identification module 310, reduction module 312, analyzer 314, comparison module 316, selection module 318, gain module 320, provision module 502, gain module 504, flowchart 200 (including any step of flowchart 200), flowchart 400 (including any step of flowchart 400), flowchart 600 (including any step of flowchart 600), and/or flowchart 700 (including any step of flowchart 700), as described herein.

A user may enter commands and information into the computer 800 through input devices such as keyboard 838 and pointing device 840. Other input devices (not shown) may include a microphone, joystick, game pad, satellite dish, scanner, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROMs), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system comprising:
an analyzer configured to analyze a first frequency spectrum of a first audio signal to determine a first portion of the first frequency spectrum that has a magnitude that is lower than magnitudes of other portions of the first frequency spectrum;
a modification module configured to modify the first frequency spectrum to decrease the magnitude of the first portion of the first frequency spectrum with respect to the other portions of the first frequency spectrum in response to the magnitude of the first portion of the first frequency spectrum being lower than the magnitudes of the other portions of the first frequency spectrum,
the modification module further configured to modify a second frequency spectrum of a second audio signal to increase a magnitude of a first portion of the second frequency spectrum with respect to other portions of the second frequency spectrum in response to the magnitude of the first portion of the first frequency spectrum being lower than the magnitudes of the other portions of the first frequency spectrum, the first portion of the first frequency spectrum and the first portion of the second frequency spectrum corresponding to a common set of frequencies; and
a mixer configured to mix the first audio signal and the second audio signal to provide a mixed audio signal.

2. The system of claim 1, wherein the analyzer is further configured to compare selection criteria that are based on the first frequency spectrum to a plurality of frequency spectrums of a plurality of respective designated audio signals to determine which frequency spectrum of the plurality of frequency spectrums satisfies the selection criteria to a greater extent than other frequency spectrums in the plurality of frequency spectrums; and
wherein the system further comprises:
a selection module configured to select the second audio signal from the plurality of designated audio signals to be mixed with the first audio signal based on the second frequency spectrum satisfying the selection criteria to a greater extent than other frequency spectrums in the plurality of frequency spectrums.

3. The system of claim 1, wherein the first audio signal has a specified perceptual characteristic; and
wherein the system further comprises:
a gain module configured to apply a first gain to the first audio signal and a second gain to the second audio signal, such that the mixed audio signal has the specified perceptual characteristic.

4. The system of claim 1, wherein a first time period, a second time period, a third time period, a fourth time period, and a fifth time period occur in consecutive temporal order; and wherein the mixer comprises:
a provision module configured to provide the first audio signal having a first gain equal to a first upper threshold for a duration of the first time period and for a duration of the fifth time period,
the provision module further configured to provide the second audio signal having a second gain equal to a second lower threshold for the duration of the first time period and for the duration of the fifth time period,
the provision module further configured to provide the first audio signal having the first gain equal to a first lower threshold for a duration of the third time period,
the provision module further configured to provide the second audio signal having the second gain equal to a second upper threshold for the duration of the third time period; and
a gain module configured to smoothly decrease the first gain from the first upper threshold to the first lower threshold during the second time period,
the gain module further configured to smoothly increase the second gain from the second lower threshold to the second upper threshold during the second time period,
the gain module further configured to smoothly increase the first gain from the first lower threshold to the first upper threshold during the fourth time period,
the gain module further configured to smoothly decrease the second gain from the second upper threshold to the second lower threshold during the fourth time period.

5. The system of claim 1, wherein the common set of frequencies represents disjoint frequency ranges.

6. The system of claim 1, wherein the modification module is configured to decrease the magnitude of the first portion of the first frequency spectrum to approximately zero.

7. A method comprising:
analyzing a frequency spectrum of a first audio signal to determine frequency spectrum criteria for selection of a second audio signal to be mixed with the first audio signal;
comparing the frequency spectrum criteria to a plurality of frequency spectrums of a plurality of respective designated audio signals, using at least one processor, to determine a first frequency spectrum of the plurality of frequency spectrums that satisfies the frequency spectrum criteria to a greater extent than other frequency spectrums in the plurality of frequency spectrums; and
selecting a second audio signal from the plurality of designated audio signals to be mixed with the first audio signal based on the first frequency spectrum corresponding to the second audio signal.

8. The method of claim 7, wherein analyzing the frequency spectrum comprises:
analyzing the frequency spectrum of the first audio signal to determine at least one frequency band in the frequency spectrum of the first audio signal that has a lesser magnitude than other frequency bands in the frequency spectrum of the first audio signal; and
determining the frequency spectrum criteria to indicate a greater magnitude in the at least one frequency band than in the other frequency bands.

9. The method of claim 8, wherein the at least one frequency band represents disjoint frequency ranges.

10. The method of claim 7, further comprising:
modifying the first frequency spectrum based on the frequency spectrum of the first audio signal to provide a modified first frequency spectrum; and
mixing the second audio signal having the modified first frequency spectrum and the first audio signal to provide a mixed audio signal.

11. The method of claim 7, further comprising:
modifying the frequency spectrum of the first audio signal based on the first frequency spectrum to provide a modified frequency spectrum; and
mixing the first audio signal having the modified frequency spectrum and the second audio signal to provide a mixed audio signal.

12. The method of claim 7, wherein analyzing the frequency spectrum of the first audio signal comprises:
analyzing the frequency spectrum of the first audio signal having a specified perceptual characteristic; and
wherein the method further comprises:
applying a first gain to the first audio signal and a second gain to the second audio signal; and
mixing the first audio signal and the second audio signal to provide a mixed audio signal having the specified perceptual characteristic in response to applying the first gain to the first audio signal and the second gain to the second audio signal.

13. The method of claim 7, further comprising:
mixing the first audio signal and the second audio signal for a duration that includes a first time period, a second time period, a third time period, a fourth time period, and a fifth time period that occur in consecutive temporal order;
wherein mixing the first audio signal and the second audio signal comprises:
providing the first audio signal having a first gain equal to a first upper threshold for a duration of the first time period and for a duration of the fifth time period;
providing the second audio signal having a second gain equal to a second lower threshold for the duration of the first time period and for the duration of the fifth time period;
smoothly decreasing the first gain from the first upper threshold to a first lower threshold during the second time period;
smoothly increasing the second gain from the second lower threshold to a second upper threshold during the second time period;
providing the first audio signal having the first gain equal to the first lower threshold for a duration of the third time period;
providing the second audio signal having the second gain equal to the second upper threshold for the duration of the third time period;
smoothly increasing the first gain from the first lower threshold to the first upper threshold during the fourth time period; and
smoothly decreasing the second gain from the second upper threshold to the second lower threshold during the fourth time period.

14. A system comprising:
an analyzer configured to analyze a frequency spectrum of a first audio signal to determine frequency spectrum criteria for selection of a second audio signal to be mixed with the first audio signal;
a comparison module configured to compare the frequency spectrum criteria to a plurality of frequency spectrums of a plurality of respective designated audio signals to determine a first frequency spectrum of the plurality of frequency spectrums that satisfies the frequency spectrum criteria to a greater extent than other frequency spectrums in the plurality of frequency spectrums; and
a selection module configured to select a second audio signal from the plurality of designated audio signals to be mixed with the first audio signal based on the first frequency spectrum corresponding to the second audio signal.

15. The system of claim 14, wherein the analyzer is configured to analyze the frequency spectrum of the first audio signal to determine at least one frequency band in the frequency spectrum of the first audio signal that has a lesser magnitude than other frequency bands in the frequency spectrum of the first audio signal; and
wherein the analyzer is configured to determine the frequency spectrum criteria to indicate a greater magnitude in the at least one frequency band than in the other frequency bands.

16. The system of claim 15, wherein the at least one frequency band represents disjoint frequency ranges.

17. The system of claim 14, further comprising:
a modification module configured to modify the first frequency spectrum based on the frequency spectrum of the first audio signal to provide a modified first frequency spectrum; and
a mixer configured to mix the second audio signal having the modified first frequency spectrum and the first audio signal to provide a mixed audio signal.

18. The system of claim 14, further comprising:
a modification module configured to modify the frequency spectrum of the first audio signal based on the first frequency spectrum to provide a modified frequency spectrum; and
a mixer configured to mix the first audio signal having the modified frequency spectrum and the second audio signal to provide a mixed audio signal.

19. The system of claim 14, wherein the frequency spectrum of the first audio signal has a specified perceptual characteristic; and
wherein the system further comprises:
a gain module configured to apply a first gain to the first audio signal and a second gain to the second audio signal; and
a mixer configured to mix the first audio signal and the second audio signal to provide a mixed audio signal having the specified perceptual characteristic in response to application of the first gain to the first audio signal and the second gain to the second audio signal.

20. The system of claim 14, further comprising:
a mixer configured to mix the first audio signal and the second audio signal for a duration that includes a first time period, a second time period, a third time period, a fourth time period, and a fifth time period that occur in consecutive temporal order;
wherein the mixer comprises a provision module and a gain module,
the provision module configured to provide the first audio signal having a first gain equal to a first upper threshold for a duration of the first time period and for a duration of the fifth time period,
the provision module further configured to provide the second audio signal having a second gain equal to a second lower threshold for the duration of the first time period and for the duration of the fifth time period,
the gain module configured to smoothly decrease the first gain from the first upper threshold to a first lower threshold during the second time period,
the gain module further configured to smoothly increase the second gain from the second lower threshold to a second upper threshold during the second time period,
the provision module further configured to provide the first audio signal having the first gain equal to the first lower threshold for a duration of the third time period,
the provision module further configured to provide the second audio signal having the second gain equal to the second upper threshold for the duration of the third time period,
the gain module further configured to smoothly increase the first gain from the first lower threshold to the first upper threshold during the fourth time period,
the gain module further configured to smoothly decrease the second gain from the second upper threshold to the second lower threshold during the fourth time period.

* * * * *